United States Patent [19]

Marciano-Agostinelli et al.

[11] Patent Number: 5,049,593

[45] Date of Patent: Sep. 17, 1991

[54] STRANDED CONDUCTOR FILLING COMPOUND OF LOW MOLECULAR WEIGHT POLYMER AND WATER SWELLABLE ORGANIC MATERIAL

[75] Inventors: Fabrizio Marciano-Agostinelli; Marco Barbaro-Forleo, both of Short Hills, N.J.

[73] Assignee: Pirelli Cable Corporation, Florham Park, N.J.

[21] Appl. No.: 333,773

[22] Filed: Apr. 5, 1989

Related U.S. Application Data

[60] Continuation of Ser. No. 68,670, Jul. 1, 1987, abandoned, which is a division of Ser. No. 864,196, May 16, 1986, Pat. No. 4,703,132.

[51] Int. Cl.$^5$ .............................................. H02G 15/00
[52] U.S. Cl. ...................................... 523/173; 524/35; 524/37; 524/42; 524/521; 524/523
[58] Field of Search ................... 523/173; 524/35, 37, 524/42, 521, 523

[56] References Cited

U.S. PATENT DOCUMENTS

| | | | |
|---|---|---|---|
| 2,558,929 | 7/1951 | Bunish et al. | 523/173 |
| 3,893,962 | 7/1975 | Walton et al. | 523/173 |
| 4,351,913 | 9/1982 | Patel | 523/173 |
| 4,382,821 | 5/1983 | Davis et al. | 523/173 |

FOREIGN PATENT DOCUMENTS

| | | | |
|---|---|---|---|
| 1465676 | 9/1971 | Fed. Rep. of Germany | 523/173 |
| 2320254 | 11/1974 | Fed. Rep. of Germany | 523/173 |
| 3438780 | 4/1986 | Fed. Rep. of Germany | 523/123 |
| 2378337 | 9/1978 | France | 523/173 |
| 2092176 | 8/1982 | United Kingdom | 523/173 |

Primary Examiner—Joseph L. Schofer
Assistant Examiner—J. M. Reddick
Attorney, Agent, or Firm—Brooks Haidt Haffner & Delahunty

[57] ABSTRACT

A water migration resisting filler for filling the interstices of a stranded conductor, an electrical power transmission cable including such filler and a method of making such cable. The filler includes a polymeric compound having a 100 gram needle penetration value between 50 anad 100 tenths of a millimeter at 25° C. and particles of a water swellable material having a particle size of not greater than 20 microns are in contact with the polymeric compound either by admixing it with the compound or applying it to the surface thereof. In the method, the polymeric compound is flowed around the wires of the conductor as they are stranded together and the water swellable material is either admixed with the compound or applied thereto as the conductor is formed, a semi-conductive layer is extruded around the so-filled conductor and a layer of insulation is extruded around the semi-conductive layer.

9 Claims, 2 Drawing Sheets

STRANDED CONDUCTOR FILLING COMPOUND OF LOW MOLECULAR WEIGHT POLYMER AND WATER SWELLABLE ORGANIC MATERIAL

This application is a continuation of application Ser. No. 07/068,670, filed 7/1/87 now abandoned, which is a division of application Ser. No. 864,196, filed May 16, 1986 now U.S. Pat. No. 4,703,132.

The present invention relates to a filling compound for electrical cables, and cables including such a compound, which prevents migration of water lengthwise of the stranded wires of the conductor of the cable.

It is known in the art that cable insulation is deteriorated by the development and propagation of water/chemical trees when moisture is present in regions of the insulation structure of the cable and particularly in regions of localized high electrical stress caused by voids, contaminants and protrusions from the conductor and insulation stress control layers. Water present in the spaces between the strands of a multi-stranded conductor is recognized as significantly accelerating the propagation of water/chemical in the insulation. It is therefore desirable to fill all spaces between such wires with a filling compound so as to minimize or prevent ingress and movement of water in such spaces. See, for example, U.S. Pat. Nos. 4,095,039; 4,104,480; 4,145,567; 3,943,271.

As pointed out in U.S. Pat. No. 4,095,039, some of the prior art filling compounds are not satisfactory after aging due to loss of adhesive qualities and hardening and fracturing thereof. The patent discloses the use of low molecular weight polyisobutylene rubber or a low molecular weight copolymer of isobutylene-isoprene rubber with 40–150 parts by weight of electrically conductive carbon black or graphite added thereto as a filling compound, such compound having a putty-like consistency at room temperature and good adhesiveness which is retained during operation of the cable.

Another advantage indicated by the use of the filling compound disclosed in U.S. Pat. No. 4,095,039 is that the filling compound can be applied by means of a pump supplying the compound to an applicator where the spaces between the wires are filled and the wires coated. This indicates that the compound is flowable and does not require high pressures for its application. This property eliminates the need for an extrusion head and the expense thereof which is necessary for some filling compounds which can be extruded over the wires.

U.S. Pat. No. 4,145,567 discloses a similar filling compound made of ethylene propylene rubber compounded with a substantial amount of carbon black so as to give it a putty-like consistency and a drip-point above 100° C.

It has been found that the filling compounds of said U.S. Pat. Nos. 4,095,039 and 4,145,567 are quite effective as filling compounds for stranded conductors of electrical cables, but it has also been found that some problems still exist from the standpoint of preventing ingress and flow of water in the conductor while preventing overfill of the spaces under the outer layer of wires. Thus it has been found that under some conditions, such as cable handling, subsequent manufacturing operations and after accelerated cyclic aging test simulating cyclic loading of the cable in the field some ingress of water into the conductor and movement over a limited length of the conductor may occur although a significant improvement has been achieved.

Furthermore, in the manufacturing operation of completely filling the spaces between the strands, the volume of filling compound is difficult to control and the extent of the fill can vary along the length of the stranded conductor. In this regard it should be recognized that normally the outer interstices of the stranded conductor are filled by the pressure extrusion of the conductor stress control layer and no supplemental filling of the spaces is required. Where the spaces between the outer layer of wires and the next to outer layer of wires is overfilled with filling compound, the extrusion of the semiconducting stress control layer over the stranded conductor can cause penetration of filling compound into the outer interstices of the conductor resulting in protrusion of the extruded semiconducting stress control layer into the insulation. Since such protrusions result in localized high electrical stresses in the insulation, such effects are highly undesirable In some cases, it is considered desirable to also fill the outer interstices of the conductor with filling compound in which case a semiconducting rubber filled tape is applied lapped on itself over the completely filled conductor followed by extrusion of the semiconducting stress control layer. In this case overfilling of the spaces between the outer layer of wires and the next to outer layer of wires is not objectionable and does not represent a problem.

One object of this invention is to improve the resistance to ingress and movement of water between and around the wires of an electrical cable conductor by providing an improved filling compound of the type disclosed in said U.S. Pat. Nos. 4,095,039 and 4,145,567.

Another object of the invention is to provide a cable particularly adapted for high voltage operation which is less subject to failure due to water/chemical treeing by exclusion of water between and around the wires of the conductor thereof.

A further object of the invention is to provide a new concept for a filling compound system which significantly reduces any irregularities in the extruded semiconducting stress control layer around the conductor of the cable due to overfilling of the spaces between the wires between the outer layer of wires and the next to outer layer of wires.

In accordance with the invention, the filling compound comprises a low molecular weight rubber admixed with fine particles of a material and/or with a thin layer of fine particles of a material applied over the filling compound which swells when it absorbs water. The filling compound is soft and flowable when applied and can be applied to the conductor without the use cf extrusion equipment. The filling compound is applied to the conductor wires as they are brought together in concentric layers, except in most cases for the outer layer of wires, and thereafter the inner layers of wires with the filling compound therearound and therebetween and the outer surface of the conductor are covered by extrusion with a conventional semiconducting stress control layer. In this case, the pressure extruded semiconducting conductor stress control layer completely fills the interstices in the outer layer of wires. Where the outer interstices are filled with filling compound a suitable semiconducting rubber filled tape is applied with overlap over the completely compound filled conductor followed by extrusion of the semiconducting conductor stress control layer. A layer of extruded insulation is applied over the screening layer, and if desired, further conventional layers, such as another semi-conductive screening layer, a metal shield, etc., may be applied over the layer of insulation.

The filling compound may be applied to the conductor wires in the known manner, i.e. without extruding it thereover, but in a preferred method of the invention, the filling compound is applied to each layer of wires in a known manner so that the filling compound fills all spaces between the inner layers of wires and the layer of wires applied thereto. As the filling compound is applied over a layer of wires, the filling compound is exposed to said fine particles of swellable material, such as by passing the filled layer through a trough containing such particles which are pneumatically agitated or blown about, so that such particles adhere to any filling compound exposed thereto. As the overlying layer of previously uncoated wires is applied, the inner spaces between these wires and the wires coated with the filling compound and said fine particles of swellable material are filled by transfer from the underlying filled layers of wires. The filled and coated layers of wires, except for the outer interstices and surface of the outermost layer of wires which normally are not filled or coated pass through a final closing die which places all wires and layers in intimate contact with each other. The conventional semiconducting conductor stress control layer, insulation, etc. are subsequently extruded over the conductor. In this way the semiconducting conductor stress control layer fills all outer interstices in the outer layer of wires. Of course, any spaces between the inner wires and the outer wires are filled by the filling compound.

In addition to, or in lieu of applying a fine layer of water swellable material to one or more layers of filling compound applied over each layer of wires, the water swellable powder may be previously mixed with the filling compound and applied in the manner described heretofore.

Other objects and advantages of the present invention will be apparent from the following description of the presently preferred embodiments thereof, which description should be considered in conjunction with the accompanying drawings in which.

Figure 1:
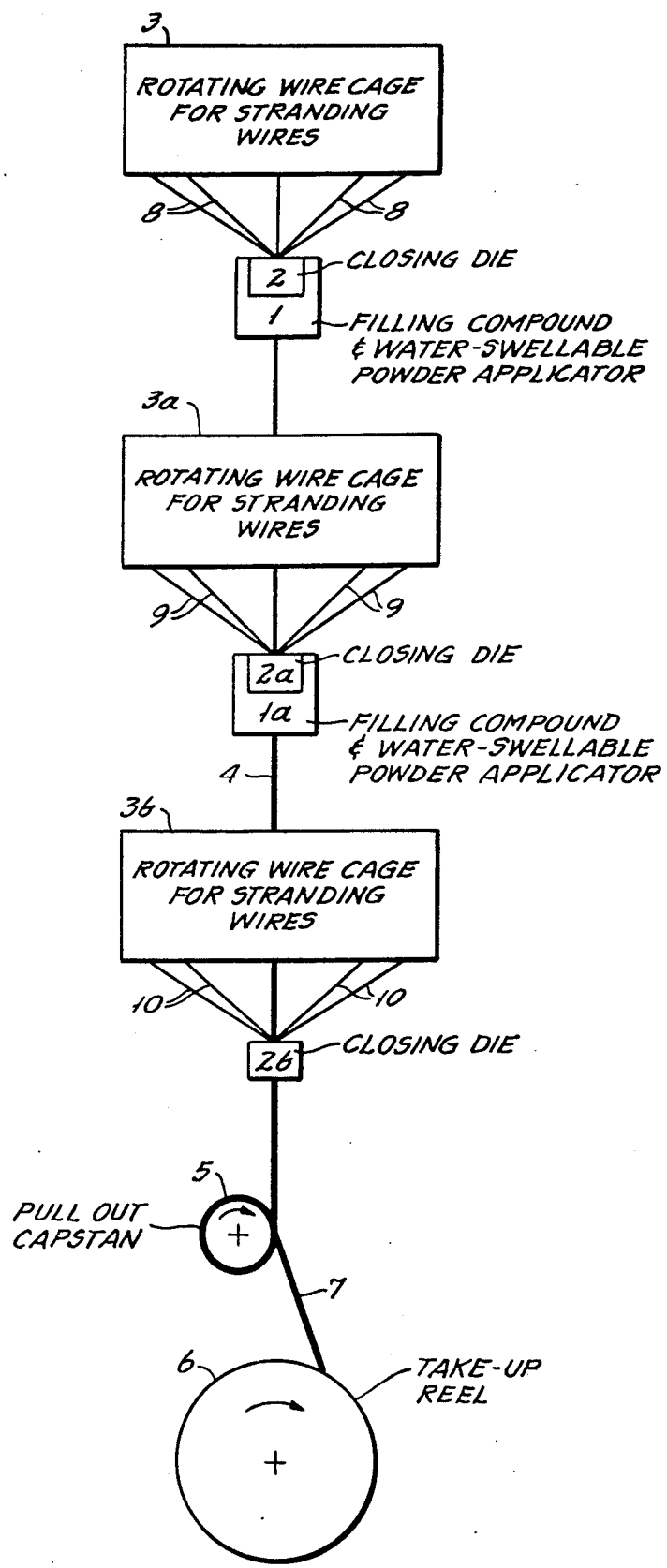
FIG. 1 is a block diagram illustrating one method of making cable of the invention.

FIG. 1 is a block diagram illustrating the steps of the preferred embodiment of the method of the invention in which the polymeric compound and the water swellable powder is applied to only the inner layers of a stranded conductor 7. A plurality of wires 8 carried on a conventional wire cage 3 are pulled and stranded and enter a closing die 2. During the stranding, the filling compound, either with or without the particles of the water swellable material admixed therein, is applied around the wires at the applicator 1. If the particles are not admixed with the filling compound, the particles are separately applied to the filling compound on the wires, such as by passing the coated wires through a suitable conventional powder applicator. If the particles are admixed with the filling compound, the particles may also be separately applied or the separate application of the particles may be omitted.

The next layer of wires 9 are similarly stranded over the first layer of wires at the wire cage 3a and are similarly coated with the filling compound and the particles at the closing die 2a and the applicator 1a.

The next layer of wires 10 are similarly stranded over the first two layers of wires at the wire cage 3b and pulled through the closing die 2b. However, in this preferred method, the filling compound is not applied to the wires forming the outer layer.

The wire assembly or conductor 7 is pulled by the pull out capstan 5 and the conductor 7 is collected on the take-up reel 6. The conductor 7 is drawn off the reel 6 at a conventional extrusion line where the semi-conductive screens and insulation are extruded over the conductor, and if desired, other layers of materials are applied. In the case where the filling compound and particles are applied to the wires 10, the conductor 7 may have a layer of semi-conductive tape applied thereto prior to the application of the first semi-conductive screen or stress control layer.

If desired, the filling compound and particles may also be applied to the wires 10 forming the outer layer in the same manner as they are applied to the wires forming the inner layers. In this case, provided that there is proper control of the quantity of filling compound and particles, the screening layer may be applied directly to the outer surface of the conductor 7, but preferably a layer of semi-conducting tape is applied over the conductor 7 before the screening layer is applied.

Although only three layers of wires have been illustrated, it will be apparent that there may be only two layers or more than three layers of wires.

Figure 2:
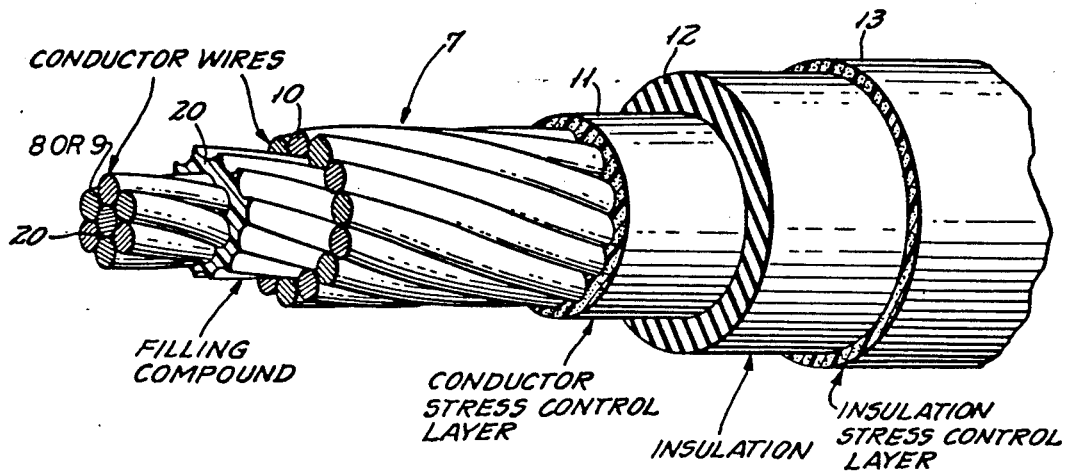
FIG. 2 is a cut-away perspective view of a cable of the invention showing the filling compound containing or without the particles of water swellable powder contained therein filling all spaces between wires except for the interstices of the outer layer which are filled by the pressure extruded semiconducting conductor stress control layer.

FIG. 2 illustrates a cable with inner wires, e.g. wires 8 or 9, with the filling compound and admixed particles 20 thereon and filling any interstices therebetween. The filling compound has not been applied to the outer wires 10, the outer interstices of which are filled with a layer 11 of semi-conductive material. The layer 11 is covered by a layer 12 of insulating material which in turn is covered by a layer 13 of semi-conductive material. In this embodiment, as in the other embodiments, other layers of material may surround the layer 13.

Figure 3:
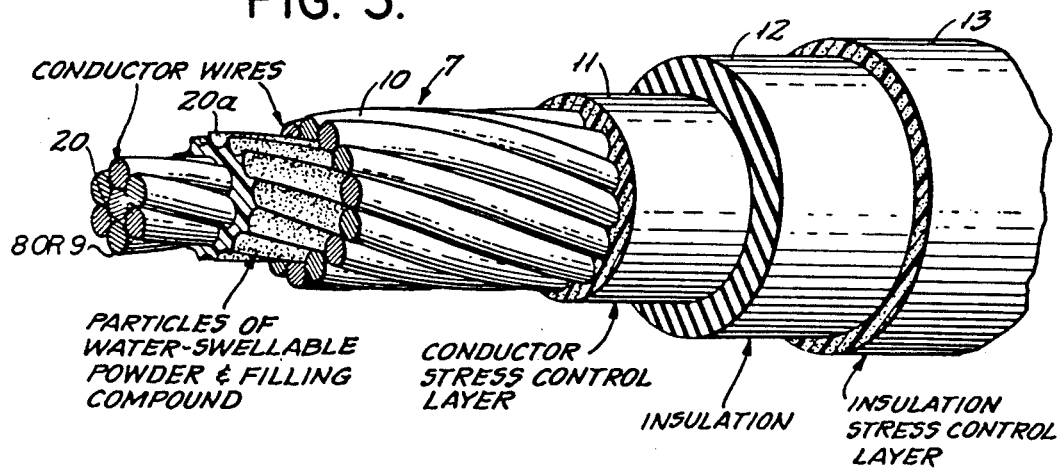
FIG. 3 is the same as FIG. 2 except that the filling compound with or without the particles of water swellable powder contained therein has a thin layer of particles of water swellable powder applied to one, several or all layers of the filling compound.

FIG. 3 illustrates a cable similar to the cable shown in FIG. 2 except that particles 20a of the water swellable material are applied to the surface of the compound 20, with or without admixed particles, applied to the inner wires.

Figure 4:
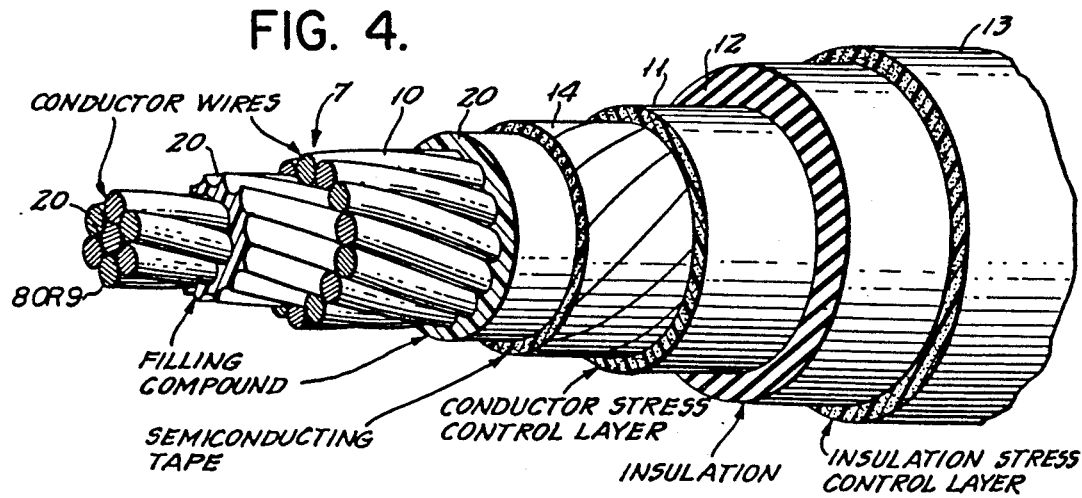
FIG. 4 is a cut-away perspective view of a cable similar to FIGS. 2 and 3 except showing filling compound in the interstices of the outer layer of wires followed by a semiconducting tape applied lapped on itself, the extruded semiconducting conductor stress control layer etc.

FIG. 4 illustrates a cable similar to the cables shown in FIGS. 2 and 3 except that the outer wires 10 are also covered with, and the interstices therebetween are filled with, the filling compound 20 with particles admixed with, or applied to the surface of the compound and except for the addition of a layer of semi-conducting tape 14 between the wires 10 and the semi-conducting screen 11.

The electrical cable conductor filling compound of the invention comprises a polymer which can be readily pumped at elevated temperatures above 100° C. Normally, this means that the polymer will be a low molecular weight polymer such as low molecular weight polyisobutylene rubber and a low molecular weight copolymer of isobutylene-isoprene rubber and can be a mixture of ethylene propylene rubber compounded with a substantial amount of carbon black as described in said U.S. Pat. Nos. 4,095,039 and 4,145,567 or other suitable mineral fillers. Other polymers having such characteristics will be apparent to those skilled in the art. A polymer which has been found to be particularly suitable is low molecular weight LM polyisobutylene sold by Exxon Chemical Americas, P.0. Box 3272, Houston, Tex. under the trademark VISTANEX.

The preferred base polymer of the filling compound of the invention does not have any significant Shore A hardness. A test or determining whether or not the base polymer has acceptable properties is the Penetrometer Test incorporated in ASTM D5 Penetration of Bituminous Materials. The 100 grams needle penetration value at 25° C. should be in the range from 110 to 180 tenths of a millimeter.

The material which swells or expands in the presence of water should be a powder having the following properties:

a) The powder has to be substantially insoluble in water.

b) The ph of the water dispersion of the powder obtainable by dispersing 1 gr. of powder in 200 cm$^3$ of bi-distilled water should be in the range from 6.5 to 7.5;

c) The weight loss of the powder after heating at 105° C. should be lower than 7%;

d) The powder wetting time (corresponding to the time lapse between the moment the powder is put in contact with water and the moment at which the expansion and swelling begins) should be in the range of less than 1 to 10 seconds whether the water is tap water, industrial use water, or sea water;

e) The powder water absorbing capability expressed in cm$^3$ of water absorbed by 1 gr of powder should be in the range from 10 to 800 cm$^3$/gr. or greater. In particular, the powder capability in relation to industrial water should be in the range from 200 to 800 cm$^3$/gr. or greater, while its capability for the absorption of sea water should be in the range from 10 to 150 cm$^3$/gr or greater; and f) The particle size of the powder should be less than 200 microns and preferably, at least 50% of the particles of such powder should have sizes less than 150 microns.

Examples of materials which may be used for the swellable powders are polyacrylates and polyacrylamides, either alone or copolymerized with natural polymers such as amides and cellulose and the esters of, methyl cellulose and cellulose ethers, such as carboxymethyl cellulose. A material which has been found to be especially suitable is the Type J-550 sodium polyacrylate sold by the Grain Processing Corporation, Muscatine, Iowa.

The weight of the powder to the weight of the resin (PHR) may vary over a fairly wide range, but preferably, the powder is present from an effective amount to the amount necessary to provide the desired results which can be determined empirically. Normally, the powder will be present in an amount of at least 0.5 PHR to not more than 50 PHR and preferably, is present in an amount in the range from 0.5 PHR to 20 PHR.

In the preferred embodiments of the invention the filler material that fills all spaces of the stranded conductor, as illustrated herein, is a compound of low molecular weight polyisobutylene rubber or a low molecular weight copolymer of isobutylene-isoprene rubber. To either of these isobutylene rubber materials 15 to 150 parts by weight of electrical conductive carbon black or graphite material or non-conductive mineral filler such as silica, talc, titanium dioxide, clay, is added for each 100 parts of the isobutylene rubber material.

The addition of the carbon makes the filler material semi-conductive. The addition of the carbon or non-conductive mineral fillers serves an important function in that it prevents flow of the isobutylene rubber material at temperatures up to 200° C. Thus the filler material can withstand temperatures encountered during heavy loads on the power transmission lines without softening and having its viscosity become so low that it will flow out of the cable at cable ends or flow lengthwise where the cable is on a substantial slope.

Some material can be added, if necessary, as a processing aid; for example, a hydrocarbon oil, such as used in rubber compounding, or a chlorinated paraffin or isobutylene liquid plasticizer can be used to bring the isobutylene rubber compound to a pumping consistency without utilizing excessive heat. It is preferable, however, to use as little processing aid as possible or none at all when it is not necessary for obtaining a pumping consistency.

The disadvantages of the processing aids are that they may migrate into the insulation shield and cause swelling and a consequent reduction in the conductivity of the shield.

The amount of electrical conductive carbon black or graphite material or mineral filler which is mixed with the isobutylene rubber material is from 15 to 150 parts by weight of the filler to 100 parts of the isobutylene rubber compound; and the preferred range is from 15 to 50 parts. The 100 grams needle penetration of the preferred compound at 25° C. should be in the range of 50 to 100 tenths of a millimeter.

When particles of water swellable powder are applied as a thin layer over one, several or all layers of the filling compound applied over the concentric layers of wires, the thickness of the particles of water swellable powder shall be in the order of several tens to several hundreds of microns.

The filler compound of this invention is of a putty-like consistency at room temperatures, and it has good adhesiveness. One of the outstanding advantages of the filler of this invention is its retention of adhesiveness in spite of repeated heating and cooling resulting from load cycling of high voltage power transmission cables. It is essential for a filler compound to retain both its flexibility and its adhesiveness in order to be satisfactory. If the compound becomes brittle, it will separate easily from an adjacent face of the material or fracture as the result of expansion and contraction of the cable.

The filler compound of this invention by virtue of the addition of particles of water swellable powder in the mixture of the compound or applied as a thin layer over the filler compound serves as a more effective block against ingress and movement of the water and permits underfilling of the space between the outer layer of wires and the next to outer layer of wires thus minimizing the risk of penetration of the filling compound into the outer interstices of the conductor during extrusion of the semiconducting conductor stress control layer causing objectionable protrusions of this layer into the insulation while still blocking ingress of and movement of water through the conductor.

For use between the outer interstices of the stranded conductor and the conductor shield, the filler material of this invention must be semi-conductive and also retain its resistivity. The volume resistivity of the filling compound applied, as above described, preferably does not exceed 50,000ohm-centimeters, a value established by the cable industry for semi-conductive material used in cables.

The filler material of this invention is not intended as a replacement for the conductor shield. Its primary purpose is to provide an adhesive filler that sticks to the conductor and to the inside surface of the conductor shield. If the conductor is stranded, as is usually the case, then the filler of this invention eliminates voids in spaces between the strands of the conductor.

We claim:

1. A filling composition for filling the interstices between a plurality of wires of a conductor, said filling composition being a polymeric compound having a 100 gram needle penetration value between 50 and 100 tenths of a millimeter at 25° C. and consisting essentially of a low molecular weight polymer having a 100 gram needle penetration value between 110 and 180 tenths of a millimeter at 25° C. and particles of a water swellable organic material having a particle size not greater than 200 microns, the weight of said particles to the weight of said polymer being in the range from 0.5 parts per hundred of the polymer to not more than 50 parts per hundred of the polymer.

2. A filling composition as set forth in claim 1 wherein said polymer is selected from the group consisting of poly-isobutylene rubber, a copolymer of isobutylene-isoprene rubber, ethylene propylene rubber and mixtures thereof.

3. A filling composition as set forth in claim 1 wherein said polymer is polyisobutylene rubber.

4. A filling composition as set forth in claim 1 wherein said polymer is a copolymer of isobutylene-isoprene rubber.

5. A filling composition as set forth in claim 1 wherein said polymer is ethylene propylene rubber.

6. A filling composition as set forth in claim 1 wherein said polymer is polyisobutylene rubber and said water swellable material is sodium polyacrylate.

7. A filling composition as set forth in claim 2 wherein said water swellable material is selected from the group consisting of esters of methyl cellulose, esters of cellulose ethers, polyacrylates, polyacrylamides, polyacrylates and polyacrylamides copolymerized with natural polymers, and mixtures thereof.

8. A filling composition as set forth in claim 7 wherein said water swellable material is sodium polyacrylate.

9. A filling composition as set forth in claim 7 wherein said natural polymers are selected from the group consisting of natural amide polymers and natural cellulose polymers.

* * * * *

UNITED STATES PATENT AND TRADEMARK OFFICE
CERTIFICATE OF CORRECTION

PATENT NO.   :  5,049,593

DATED        :  September 17, 1991

INVENTOR(S)  :  Marciano-Agostinelli et al

It is certified that error appears in the above-identified patent and that said Letters Patent is hereby corrected as shown below:

```
In the Abstract, line 6, "anad" should read --and--
Col. 2, line 21, before "In" a period (.) should be
       inserted;
         line 53, "cf" should read --of--;
Col. 5, line 57, "esters" should read --esthers--.
```

Signed and Sealed this

Seventh Day of December, 1993

Attest:

BRUCE LEHMAN

Attesting Officer   Commissioner of Patents and Trademarks